United States Patent
Koziel et al.

(10) Patent No.: US 12,010,231 B2
(45) Date of Patent: Jun. 11, 2024

(54) COMPUTER PROCESSING ARCHITECTURE AND METHOD FOR SUPPORTING MULTIPLE PUBLIC-KEY CRYPTOSYSTEMS BASED ON EXPONENTIATION

(71) Applicant: PQSecure Technologies, LLC, Boca Raton, FL (US)

(72) Inventors: Brian C. Koziel, Plano, TX (US); Rami El-Khatib, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/605,380

(22) PCT Filed: Jun. 23, 2021

(86) PCT No.: PCT/US2021/038624
§ 371 (c)(1),
(2) Date: May 17, 2022

(87) PCT Pub. No.: WO2022/271163
PCT Pub. Date: Dec. 29, 2022

(65) Prior Publication Data
US 2022/0417017 A1     Dec. 29, 2022

(51) Int. Cl.
*H04L 9/30*     (2006.01)
*G06F 21/60*    (2013.01)

(52) U.S. Cl.
CPC .......... *H04L 9/3066* (2013.01); *G06F 21/602* (2013.01); *H04L 2209/12* (2013.01)

(58) Field of Classification Search
CPC .. H04L 9/3066; H04L 2209/12; G06F 21/602
See application file for complete search history.

(56) References Cited

U.S. PATENT DOCUMENTS 4,338,675 A * 7/1982 Palmer .................... G06F 5/012
708/496
6,298,367 B1 * 10/2001 Oberman ............ G06F 9/30036
712/E9.02

(Continued)

FOREIGN PATENT DOCUMENTS

WO     2020036598 A1     2/2020

OTHER PUBLICATIONS

Uhsadel, Leif, et al. "Interface design for mapping a variety of RSA exponentiation algorithms on a HW/SW co-design platform." 2012 IEEE 23rd International Conference on Application-Specific Systems, Architectures and Processors. IEEE, 2012. (Year: 2012).*

(Continued)

*Primary Examiner* — Syed A Zaidi
(74) *Attorney, Agent, or Firm* — Johnson | Dalal; Mark C. Johnson

(57) ABSTRACT

A computer processing system have includes a processing unit operably configured to perform a plurality of exponentiation operations and a cryptosystem controller operably configured to load an exponent from the at least one exponentiation operation from a memory to an algorithm controller by first applying a function, wherein the algorithm controller including at least one set of shift registers operably configured to shift a plurality of digits and operably configured to utilize at least one of the plurality of digits as an output.

11 Claims, 6 Drawing Sheets

(56) References Cited

U.S. PATENT DOCUMENTS

| | | | |
|---|---|---|---|
| 6,947,047 B1* | 9/2005 | Moy | G06F 9/3838 |
| | | | 345/506 |
| 7,512,233 B2* | 3/2009 | Lambert | H04L 9/0844 |
| | | | 713/169 |
| 2001/0033655 A1* | 10/2001 | Vadekar | H04L 9/3066 |
| | | | 708/492 |
| 2003/0140077 A1* | 7/2003 | Zaboronski | G06F 7/723 |
| | | | 708/491 |
| 2003/0152221 A1 | 8/2003 | Cheng | |
| 2004/0098439 A1* | 5/2004 | Bass | G06F 7/4991 |
| | | | 708/552 |
| 2008/0065713 A1* | 3/2008 | Lee | G06F 7/728 |
| | | | 708/491 |
| 2008/0130877 A1 | 6/2008 | Joye | |
| 2008/0144837 A1* | 6/2008 | McCullagh | H04L 9/3073 |
| | | | 380/45 |
| 2008/0320271 A1 | 12/2008 | Cooke | |
| 2009/0182795 A1* | 7/2009 | Dobbek | H03M 7/24 |
| | | | 708/209 |
| 2014/0059104 A1* | 2/2014 | Shinomiya | G06F 7/4912 |
| | | | 708/495 |
| 2015/0339102 A1* | 11/2015 | Feix | H04L 9/3066 |
| | | | 380/28 |
| 2018/0157465 A1* | 6/2018 | Bittner | G06F 7/52 |
| 2020/0259648 A1 | 8/2020 | Koziel | |
| 2020/0265545 A1* | 8/2020 | Mellempudi | G06F 5/01 |
| 2020/0396075 A1* | 12/2020 | Visegrady | H04L 9/3234 |

OTHER PUBLICATIONS

NPL Search Terms (Year: 2022).*
NPL Search Terms (Year: 2023).*
NPL Search Terms (Year: 2024).*
Vasyltsov et al. "Fast digital TRNG based on metastable ring oscillator." International Workshop on Cryptographic Hardware and Embedded Systems. Springer, Berlin, Heidelberg, 2008. Aug. 10, 2008 (Aug. 10, 2008) Retrieved on Aug. 29, 2021 (Aug. 29, 2021) from <https://link.springer.com/chapter/10.1007/978-3-540-85053-3_11> entire document.

* cited by examiner

COMPUTER PROCESSING ARCHITECTURE AND METHOD FOR SUPPORTING MULTIPLE PUBLIC-KEY CRYPTOSYSTEMS BASED ON EXPONENTIATION

FIELD OF THE INVENTION

The present invention relates generally to hardware, systems, implementation, and methods directed towards exponentiation operations in public-key cryptosystems, and, more particularly, relates to efficiently performing multiple modular exponentiation or scalar point multiplication algorithms in a single system.

BACKGROUND OF THE INVENTION

Public-key cryptosystems are cryptographic systems in which a public key and private key are utilized to achieve some cryptographic application such as encryption or authentication. These cryptosystems provide a backbone for our modern digital infrastructure to secure the Internet and a vast array of digital communication. Given the plethora of public-key cryptosystems that are standardized and available for deployment, the question becomes which cryptosystems to implement on a device.

Many of the currently most popular public-key cryptosystems rely on the hardness of factoring and the discrete logarithm problem. These cryptosystems utilize groups over large finite fields such that factoring or performing a discrete logarithm operation are no longer feasible. For instance, Diffie-Hellman (DH) key exchange uses a finite field exponentiation over a large finite field such that it is infeasible to compute a discrete logarithm. Similarly, the elliptic curve Diffie-Hellman (ECDH) uses a scalar point multiplication on an elliptic curve point that is defined over a large finite field such that it is infeasible to compute an elliptic curve discrete logarithm. Other examples that use a large finite field include, but are not limited to, the digital signature algorithm (DSA), RSA, the elliptic curve digital signature algorithm (ECDSA), the Edwards curve digital signature algorithm (EdDSA), password authenticated key exchange by juggling (J-PAKE), the elliptic curve password authenticated key exchange by juggling (ECJPAKE), the supersingular isogeny Diffie-Hellman (SIDH) key exchange, the commutative supersingular isogeny Diffie-Hellman (CSIDH) key exchange, the supersingular isogeny key encapsulation (SIKE) mechanism, the short quaternion and isogeny signature (SQISign), and so on.

In each of the above schemes, a large cyclic group defined over finite fields is used in conjunction with a secret key (not necessarily the private key) to perform a hidden group operation. For cryptosystems like DH and DSA this is a finite field exponentiation. For cryptosystems like ECDH and ECDSA this is a scalar point multiplication. When implemented, these group operations are typically performed iteratively with lower-level group operations. In DH and DSA, a finite field exponentiation can be performed as a series of finite field multiplication and squaring operations. Similarly, in ECDH and ECDSA, a scalar point multiplication can be performed as a series of point doubling and addition operations.

Because of how large an exponent or scalar is for these cryptosystems, many efficient algorithms have been developed and utilized to improve a cryptosystem's performance. Unfortunately, a device in today's digital infrastructure may need to support many such cryptosystems, even if the underlying algorithms that are the most efficient conflict with each other.

Therefore, a need exists to overcome the problems with the prior art as discussed above.

SUMMARY OF THE INVENTION

The invention provides a hardware, system, implementation, and method for efficiently implementing exponentiation for multiple public key cryptosystems. Here, we define an "efficient" implementation of a cryptosystem's large group operation in a computer system as one that performs the group operation in fewer gates and fewer total operations than the state-of-the-art.

With the foregoing and other objects in view, there is provided, in accordance with the invention, a computer processing system having a processing unit operably configured to perform a plurality of exponentiation operations and a cryptosystem controller operably configured to load an exponent from the at least one of exponentiation operation from a memory to an algorithm controller by first applying a function. The algorithm controller includes at least one set of shift registers operably configured to shift a plurality of digits and operably configured to utilize at least one of the plurality of digits as an output.

In accordance with a further feature of the present invention, the algorithm controller is operably configured to read the output and dictate a subroutine of operations to perform forming part of the at least one exponentiation operation. Further, the function is an encoding function and the algorithm controller may include at least one set of single direction shift registers operably configured to be initialized from the output of the encoding function.

In accordance with yet another feature of the present invention, the encoding function is operably configured to be performed by a computing processing system external to the algorithm controller.

In accordance with a further feature of the present invention, the algorithm controller is operably configured to load and process a sequence of portions of the exponent when there are fewer shift registers than a total length of the exponent.

In accordance with another feature of the present invention, the at least one set of shift registers are operably configured to perform circular shifts.

In accordance with yet another feature of the present invention, the processing unit is operably configured to perform left-to-right and right-to-left algorithms for the at least one exponentiation operation.

In accordance with yet another feature of the present invention, the processing unit is operably configured to perform a plurality of at least one of modular exponentiation operation and/or at least one of scalar point multiplication operation.

In accordance with an additional feature of the present invention, the processing unit is operably configured to perform at least one of the following group: DH, DSA, ECDH, ECDSA, ECJPAKE, EdDSA, SIKE, SIDH, CSIDH, and SQISign. Further, the processing unit may be operably configured to perform at least one of the following group: X25519, X448, Ed25519, and Ed448, and at least one of the following group: SIKE, SIDH, CSIDH, and SQISign, over any parameter set.

In accordance with an exemplary feature of the present invention, the algorithm controller including a set of multiple direction shift registers operably configured to shift in a plurality of directions that are dictated by the algorithm controller.

In accordance with a further feature of the present invention, the algorithm controller includes a plurality of sets of single direction shift registers operably configured to share to the at least one of the plurality of digits as the output.

In accordance with another feature of the present invention, the algorithm controller including a plurality of sets of single direction shift registers operably configured to feed the at least one of the plurality of digits to a multiplexer that is operably configured to select the output.

Also in accordance with the present invention, a computer-implemented method for implementing a plurality of at least one of modular exponentiation operation and/or at least one of scalar point multiplication operations in a computer processing cryptosystem is disclosed that includes initializing memory and control units for a modular exponentiation or scalar point multiplication operation, issuing a modular exponentiation or scalar point multiplication unit to the computer processing cryptosystem, applying a function to convert the exponent used in modular exponentiation or scalar used in scalar point multiplication from its original form to an encoded form for use in an algorithm controller, initializing the algorithm controller's shift register with the encoded format of the exponent or scalar, shifting the registers in the algorithm controller in a sequence dictated by a modular exponentiation or scalar point multiplication algorithm, and performing iterations of subroutines and algorithm controller shift operations to fulfill the modular exponentiation or scalar point multiplication algorithm.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4 is a schematic diagram depicting an embodiment of this invention that uses multiple sets of single direction shift registers that converge to a single, shared register. Here, the register B can incorporate any number of shift directions and styles to accommodate multiple iterative algorithms. The output of the shift register is the register that the shift registers converge to.

DETAILED DESCRIPTION

Figure 1:
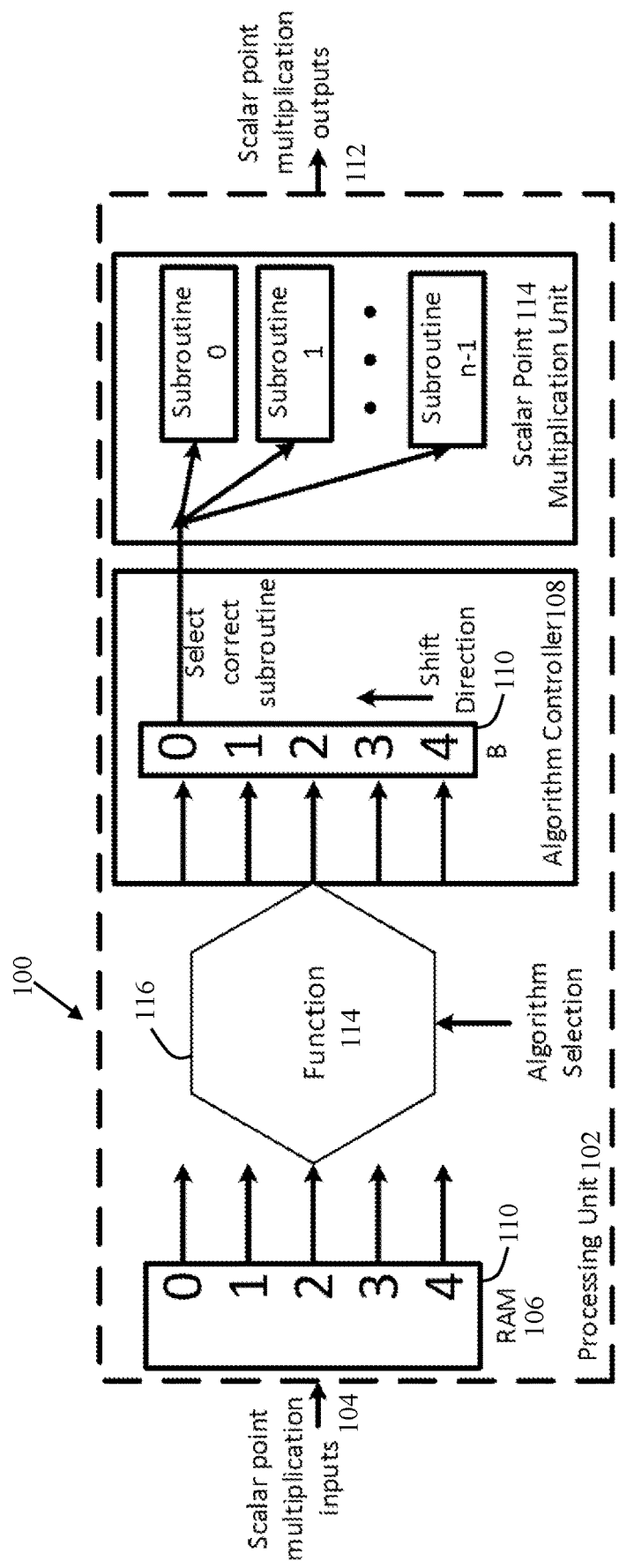
FIG. 1 is a schematic diagram depicting our invention as utilized for scalar point multiplication. By feeding scalar point multiplication inputs into the processing unit, algorithm data is loaded into the shift registers of an algorithm controller. For each iteration of an algorithm, the algorithm controller will direct a scalar point multiplication unit to perform a particular subroutine. Lastly, once the scalar point multiplication is finished, the scalar point multiplication outputs are output.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a hardware, system, implementation, and method for efficiently implementing exponentiation for multiple public key cryptosystems. Here, we define an "efficient" implementation of a cryptosystem's large group operation in a computer system as one that performs the group operation in fewer gates and fewer total operations than the state-of-the-art. This proposed invention describes several different embodiments of the invention, targeted to optimize various gate or performance metrics.

In order to define exponentiation, we first define a magma as an algebraic structure that consists of a set with a single binary operation that is closed. Said another way, a magma is a set with an operation ° that combines elements A and B in the set to form a third element C in the set. A ° B=C. An exponentiation is then the repeated application of an operation on one element in a magma. The number of repeated applications of the operation is determined by an exponent, which is an integer number. For instance, an exponent of 5 would mean that there would be 5 applications of the operation. The use of exponent and scalar is interchangeable.

Two popular uses of exponentiation include modular exponentiation over a large finite field and scalar point multiplication over an elliptic curve, which are both based on abelian groups. An abelian group is then a magma whose operation also preserves associativity, identity, invertibility, and commutativity. This innovation generally applies to exponentiation over a magma, but uses examples with modular exponentiation or scalar point multiplication for clarity.

By far the majority of today's deployed public-key cryptosystems for public-key encryption or digital signatures are based on the abelian group structure of large finite fields. These cryptosystems typically rely on the hardness of factoring or the discrete logarithm problem. These cryptosystems utilize groups over large finite fields such that factoring or performing a discrete logarithm operation are no longer feasible. For instance, Diffie-Hellman (DH) key exchange uses a finite field exponentiation over a large finite field such that it is infeasible to compute a discrete logarithm. Similarly, the elliptic curve Diffie-Hellman (ECDH) uses a scalar point multiplication on an elliptic curve point that is defined over a large finite field such that it is infeasible to compute an elliptic curve discrete logarithm. Other examples that use a large finite field include, but are not limited to, the digital signature algorithm (DSA), RSA, the elliptic curve digital signature algorithm (ECDSA), the Edwards curve digital signature algorithm (EdDSA), password authenticated key exchange by juggling (J-PAKE), the elliptic curve password authenticated key exchange by juggling (ECJPAKE), the supersingular isogeny Diffie-Hellman (SIDH) key exchange, the commutative supersingular isogeny Diffie-Hellman (CSIDH) key exchange, the supersingular isogeny key encapsulation (SIKE) mechanism, the short quaternion and isogeny signature (SQISign), and so on.

Since today's digital infrastructure may require any combination of public-key cryptosystems, even including many different varieties of parameter sets, a device may be required to support efficient computation of a wide variety of operations. The focus of the present invention is to support a plurality of exponentiation operations efficiently, even if high-level algorithms for various schemes are different. In particular, this invention targets large group operations, namely modular exponentiation and scalar point multiplication that could be used in the various schemes listed above.

Modular exponentiation ($a^b$ mod m) multiplies a by a a total of b−1 times, or a×a× . . . ×a, where the final result is reduced modulo m. Similarly, a scalar point multiplication ([k]P on curve E) adds P to P a total of k−1 times, or P+P+ . . . +P, where the final result is a point on E. In these two scenarios, b and k can be an extremely large magnitude, such as larger than $2^{256}$. For many of the listed cryptosystems, these two operations are the most expensive. As such, there have been many proposed algorithms to perform the group operation faster, more securely, or even in constant-time. These algorithms may apply to any variation of the scheme or only to specific parameter choices.

In general, the simplest method to perform a modular exponentiation or scalar point multiplication is to iterate over the exponent or scalar bits at a time. One common binary method is to iterate through each bit from right to left, as is shown in Algorithm 1. For modular exponentiation, this is called the square-and-multiply method. As an example, consider computing $3^6$ mod 11. To compute this efficiently, the exponent 6 is iterated bit by bit. In binary, 6=0b110. Thus, the square-and-multiply algorithm starts with c=1. The square-and-multiply method starts with the MSB which is 1. Therefore, the first iteration of the square-and-multiply loop computes c=1×1×a mod 11=1×1×3 mod 11=3. The second most significant bit of 6 is also 1, so the second loop computes c=3×3×3 mod 11=5. The third and least significant bit of 6 is 0, which means the third loop computes c=5×5 mod 11=3. Thus, the final answer is 3.

---

Algorithm 1
Square-and-multiply for modular exponentiation

Input: a, b < m
Output: $a^b$ mod m
Begin
1. c = 1
2. for bit i in b, from most significant to least significant
 3. c = c × c mod m
 4. if i = 1, then c = c * a mod m
5. end for
6. Output c
end

---

When performing the above algorithm in hardware, the simplest implementation involves a shift register to hold the exponent. Then, there is a subroutine for the square and a subroutine for the multiplication. For each iteration, the square subroutine would be called. However, the subroutine for multiplication is only called if the current bit of the exponent is a 1.

Shift registers are useful for a variety of iterative algorithms. In the square-and-multiply algorithm, a set of shift registers can be initialized with each bit in b. Each shift register is a flip-flop that stores a single bit. Shift registers construct a cascade of flip-flops by feeding bits in a sequence from one flip-flop to the next. Since the square-and-multiply algorithm goes from most significant to least significant, the most significant flip-flop in the set of shift registers is initialized with the most significant bit in b. This most significant flip-flop indicates a subroutine to process. The second most significant flip-flop in the set of shift registers is then initialized with the second most significant bit in b, and so on, until the least significant flip-flop contains the least significant bit in b. After an iteration, these shift registers shift such that each flip-flop holds the bit of the previous significance flip-flop. The most significant flip-flop's value can be discarded or pushed to the least significant flip-flop. The latter case is considered a circular shift operation. For each iteration in the algorithm, a shift occurs to efficiently perform the correct sequence of bits.

A single direction set of shift registers is a group of flip-flops that shift from flip-flop to flip-flop in a single orientation. A multiple direction set of shift registers is a group of flip-flops that shift from flip-flop to flip-flop in multiple orientations, generally according to a control signal. These orientations can be as simple as MSB to LSB or as complex as a non-linear sequence.

This above methodology can be generalized for the wide range of exponentiation or scalar point multiplication algorithms available. As an example, the double-and-add algorithm for scalar point multiplication is performed in the same manner as the square-and-multiply algorithm, but uses an elliptic curve point. However, many differences can appear between algorithms to compute this operation. For instance, the square-and-multiply can be seen as a left-to-right algorithm. The most significant bit (MSB) is processed first followed by the second most significant bit all the way down to the least significant bit (LSB). Another simple variation is the right-to-left algorithm that instead moves from the LSB to the MSB, where the called subroutines based on the current bit are different from the left-to-right version. Furthermore, instead of iterating bit-by-bit, some algorithms may iterate over more than one bit per loop. Examples of this include the windowed method and the comb method. Some schemes may also benefit from performing a different option, such as the non-adjacent form for scalar point multiplication as point subtraction is as simple as point addition. Lastly, some algorithms may opt to use an irregular set of operations per chunk of a word, such as to perform an addition chain.

When only one style of algorithm is implemented on a device, it is simple to device an appropriate architecture to efficiently perform the algorithm. For instance, the left-to-right algorithm can simply use a shift register that the exponent or scalar. Starting with a pointer to the MSB, each iteration can begin with a shift left and the MSB will now be the next bit of the scalar.

In the above, discussion of algorithms primarily focused on the use of bits to select a correct subroutine as part of an algorithm. However, this can easily be generalized to the concept of digits. A digit is a positive integer of bits, such as 1, 3, 17, and so on. Some algorithms may perform an iteration over multiple bits, which is now considered a digit. For instance, the windowed method for scalar point multiplication with a window of size 3 may have iterations that consist of three point doublings and one point addition, where the value added is some special multiple of the input point. These multi-bit algorithms generally have the advantage that there are fewer iterations, but the disadvantage that each iteration and control flow are more complex.

However, when multiple styles of algorithms must be implemented on a device, creating a computer processing architecture to efficiently support the exponentiation or scalar point multiplication algorithms is not so simple. For instance, consider using a right-to-left algorithm for modular exponentiation in RSA and a left-to-right algorithm for scalar point multiplication. Implementing both algorithms for fast implementation and fewer gates is a problem, for which the present invention provides four different solutions.

One primary application of the present invention can be seen depicted in the schematic diagram shown in FIG. 1. FIG. 1 specifically depicts a computer processing system 100 with a processing unit 102 configured to be utilized for scalar point multiplication operations. Specifically, same architecture and design apply to exponentiation as well. As exemplified in FIG. 1, a processing unit 102 is operably configured to perform scalar point multiplication. First, some outside entity would initialize any number of inputs 104 needed for the scalar point multiplication, which could be stored in a memory unit or a controller. Memory can be considered as random-access memory (RAM) (as exemplified in FIG. 1 as numeral 106), read-only memory (ROM), or something computed on-the-fly. When a scalar point multiplication operation is issued to the processing unit 102, the scalar used for the scalar point multiplication unit is loaded from the RAM to the algorithm controller 108 by first applying some function 114. This function 114 is general in that it converts the scalar from its RAM form to an algorithm-appropriate form for the algorithm controller 108. This function 114 can also be the identity function, wherein a direct copy from RAM 106 to algorithm controller 108 is performed. The processing unit 102 is operably configured to perform a plurality of at least one of modular exponentiation operation and/or at least one of scalar point multiplication operation. Said another way, the processing unit 102 is operably configured to perform both a modular exponentiation operation and a scalar point multiplication operation, two modular exponentiation operations, or two scalar point multiplication operations.

The scalar for the scalar point multiplication may be converted and stored in shift register B inside the algorithm controller 108. The scalar is broken up into digits of a positive integer size. When converted for the algorithm controller 108, the first digit to be used by the scalar point multiplication unit 114 is indicated by position "0", the second digit to be used is indicated at position "1", and so on. After the scalar point multiplication unit 114 performs the first iteration of the algorithm, the algorithm controller's B register (also identified with numeral 110) is shifted, such that the second digit is now the first digit. Now, the original second digit is used by the scalar point multiplication unit 114. This process continues for how many iterations are used in the algorithm for the scalar point multiplication. Upon completion, the processing unit 102 will output 112 the scalar point multiplication results.

Said another way, a cryptosystem controller 104 is operably configured to load an exponent from the at least one of exponentiation operation from a memory (e.g., RAM/ROM/Computer on the fly) 106 to an algorithm controller 108 by first applying a function 114. The algorithm controller 108 includes at least one set of shift registers 110 operably configured to shift a plurality of digits and operably configured to utilize at least one of the plurality of digits as an output. The algorithm controller 108 may also be operably configured to read the output and dictate a subroutine of operations to perform forming part of the at least one of exponentiation operation.

Figure 2:
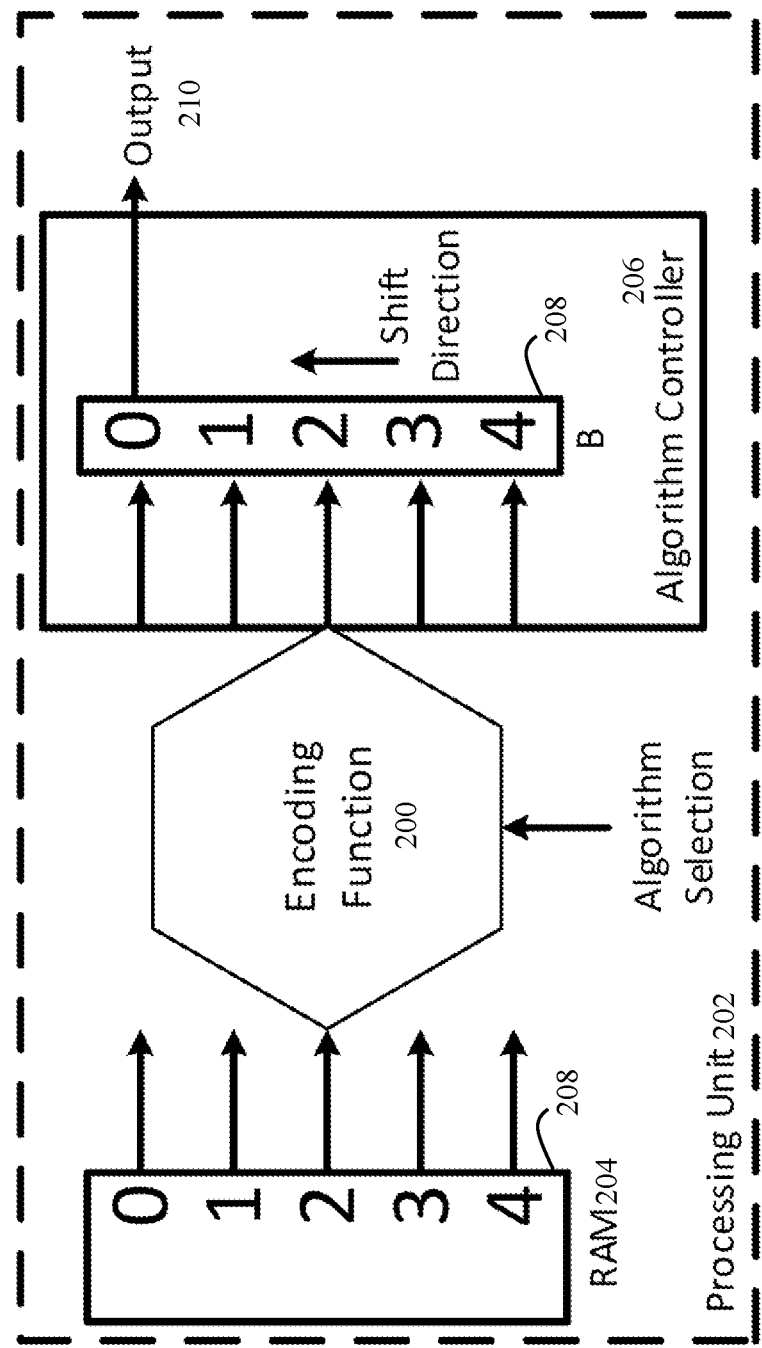
FIG. 2 is a schematic diagram depicting an embodiment of this invention that uses an encoding algorithm to encode an exponent or scalar into a simple shift scheme. The choice of encoding function is chosen by the algorithm selection control signal. The shift register B shifts in a single direction and the output is a single register within the shift register.

The first embodiment of this invention is to use only one set of single directional shift registers. This is a series of shift registers that represent the entire exponent. However, before the exponent is loaded into the shift registers, a function 116 is applied to reorder the exponent for a single directional shift register, which is shown in FIG. 2. The output indicates the current digit of the algorithm and is simply indicated by a start of the shift register. As an example, let us assume that a single set of shift-left shift registers are implemented to represent the entire exponent or scalar. The scalar for the left-to-right scalar point multiplication can be encoded by simply using the identity function and the algorithm can be processed iteratively. The exponent for the right-to-left exponentiation must then be digit-reversed before it is stored to the shift registers. The current digit for the algorithm is indicated by the MSB of the shift register. The digit-reversal is one such example of an encoding function (also indicated in FIG. 2 with numeral 200). Other algorithms such as windowed, non-adjacent form, or comb methods may have a different and more complex encoding function. An encoding function is any function that converts a number such as an exponent or scalar to a new digit representation to use in an algorithm. In addition, the single directional shift registers may be of any size. If there are fewer shift registers than digits in the exponent or scalar, then there will be multiple iterations of encoding, as the exponent or scalar is processed in chunks. FIG. 2 depicts a processing unit 202 with a cryptosystem controller that is operably configured to load an exponent from the at least one of modular exponentiation operation and/or a scalar from the at least one of scalar point multiplication operation from a memory 204 to an algorithm controller 206 by first applying a function 200 (namely an encoding function). The algorithm controller 206 including at least one set of shift registers 208 operably configured to shift a plurality of digits and operably configured to utilize at least one of the plurality of digits as an output 210. The algorithm controller 206 may include at least one set of single direction shift registers 208 operably configured to be initialized from the output of the encoding function 200. The encoding function 200 is also operably configured to be performed by a computing processing system external to the algorithm controller 206, i.e., software or separate hardware interface. The algorithm controller 206 is also operably configured to load and process a sequence of portions of the exponent when there are fewer shift registers than a total length of the exponent. The one or more set of shift registers 208 are also operably configured to perform circular shifts. Further, the processing unit 202 is also operably configured to perform left-to-right and right-to-left algorithms for the at least one of exponentiation operation. Additionally, the processing unit 202 is operably configured to perform at least one of the following group: DH, DSA, ECDH, ECDSA, ECJPAKE, EdDSA, SIKE, SIDH, CSIDH, and SQISign or the following group X25519, X448, Ed25519, and Ed448, and at least one of the following group: SIKE, SIDH, CSIDH, and SQISign, over any parameter set.

Figure 3:
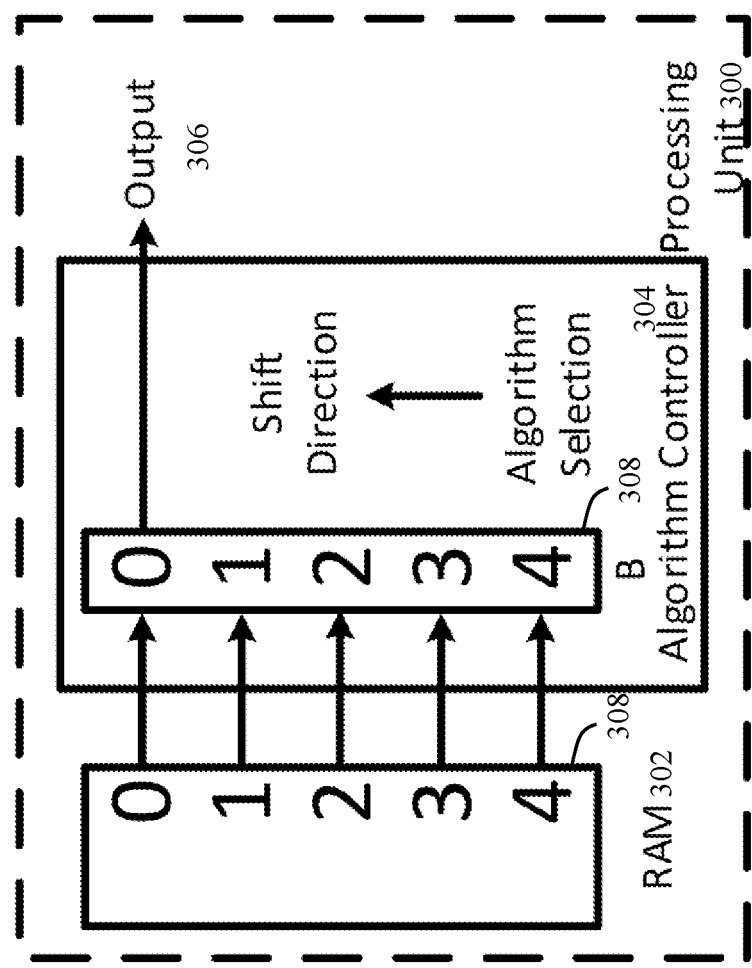
FIG. 3 is a schematic diagram depicting an embodiment of this invention that uses multiple directions of shift registers to shift in the way that the algorithm dictates. Here, the shift direction is chosen by the algorithm selection control signal. The shift register B shifts in multiple directions and the output is a single register within the shift register.

With reference now to FIG. 3, a processing unit 300 also includes an algorithm controller 304 including at least one set of shift registers 308 operably configured to shift a plurality of digits and operably configured to utilize at least one of the plurality of digits as an output 306. The present invention is operable to utilize a single set of multiple directional shift registers 308. This is a series of shift registers 308 that represent the entire exponent. In this scenario, the entire exponent is directly loaded into the shift registers 308 and the type of algorithm will dictate the direction of each of the shift registers 308, which is shown in FIG. 3. For the simple example of left-to-right and right-to-left algorithms, the shift registers 308 either shift left or right depending on the algorithm. Depending on the algorithm, the direction of the shift register can also be more than simple left or right shift, such as for the windowed, non-adjacent form, or comb methods. Furthermore, the multiple directional shift registers may be of any size. If there are fewer shift registers than digits in the exponent, then there will be multiple iterations of encoding, as the exponent or scalar is processed in chunks.

Figure 4:
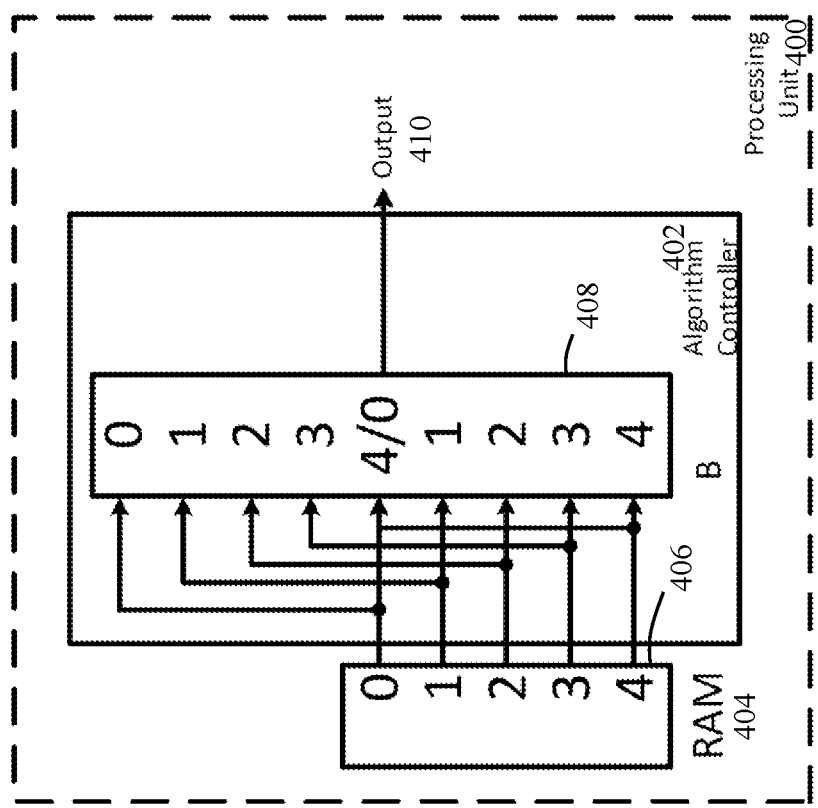

In another embodiment of this invention (depicted in FIG. 4), a processing unit 400 is utilized with an algorithm controller 402, wherein the processing unit 400 is operably configured to multiple sets of directional shift registers 406 that converge to a single register 408. The output 410 of this scheme is simply the convergent single register 408. For instance, in the case of the left-to-right and right-to-left schemes, let us assume we iterate over 5 digits at a time as is indicated by FIG. 4. Here, we have five registers from 4 down to 0 for a left-to-right algorithm and five registers from 0 up to 4 for a right-to-left algorithm. Both algorithms converge to the 0/4 register. The upper half of the B registers 408 shift left-to-right and the lower half of the B registers 408 shift right-to-left. This ensures that the 0/4 register always indicates which digit should be output 410 for the controller 402 to implement the algorithm. Depending on the algorithm, the direction of the shift register can also be more than simple left or right shift, such as for the windowed, non-adjacent form, or comb methods. Furthermore, the directional shift registers may be of any size. If there are fewer shift registers than digits in the exponent, then there will be multiple iterations of encoding, as the exponent is processed in chunks. There may be also more than two sets of shift registers that each converge to a single register.

Figure 5:
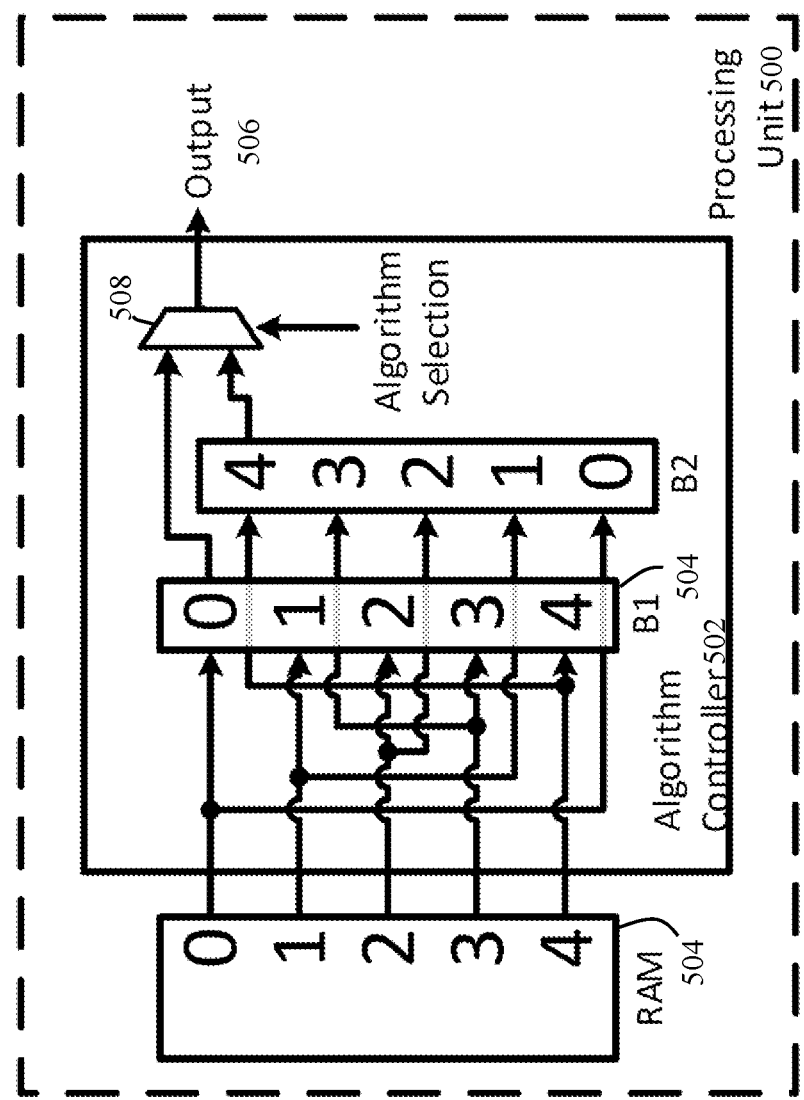
FIG. 5 is a schematic diagram depicting an embodiment of this invention that uses multiple sets of single direction shift registers, where the output is selected in a multiplexer depending on the current algorithm. Here, B1 and B2 shift in different directions and the output bit of each shift register is sent to a multiplexer.

Another embodiment of the present invention is depicted in FIG. 5, wherein a processing unit 500 also includes an algorithm controller 502 including at least one set of shift registers 504 operably configured to shift a plurality of digits and operably configured to utilize at least one of the plurality of digits as an output 506. The processing unit 500 is operable to use multiple sets of shift registers where a multiplexer 508 selects the correct digit to output 506 to the controller 502 to process the algorithm, as is exemplified in FIG. 5. For the left-to-right and right-to-left example, B2 starts with the MSB as the output for the left-to-right and B1 starts with the LSB as the output for right-to-left, respectively. Unlike the other embodiments depicted in FIGS. 1-4, the architecture in FIG. 5 utilizes a multiplexer 508 to select the correct output based on the current algorithm. Depending on the algorithm, the direction of the shift register can also be more than simple left or right shift, such as for the windowed, non-adjacent form, or comb methods. Furthermore, the directional shift registers may be of any size. If there are fewer shift registers than digits in the exponent, then there will be multiple iterations of encoding, as the exponent is processed in chunks. There may be also more than 2 sets of shift registers to handle more than two algorithms.

As an example that further describes the present invention, an implementation that supports X25519 and SIKE is described. Although both algorithms currently utilize Montgomery curves defined over an elliptic curve, the algorithms used to perform the scalar point multiplications differ. For instance, X25519 (defined in RFC 7748) computes Q=[k]P, where Q,P∈E and k is a scalar. To generate a secret kernel point, SIKE computes R=P+[k]Q, where Q,P,R∈E and k is a scalar. These computations both rely on a single scalar, k, but use different algorithms for computational efficiency. Algorithm 2 contains the Montgomery powering ladder which is a left-to-right algorithm and Algorithm 3 contains a three-point ladder which is a right-to-left algorithm. Both of these algorithms perform a point doubling and point addition for each bit of the scalar, but the order in which the scalar is iterated is different.

Algorithm 2
Montgomery ladder for X25519

Figure 6:
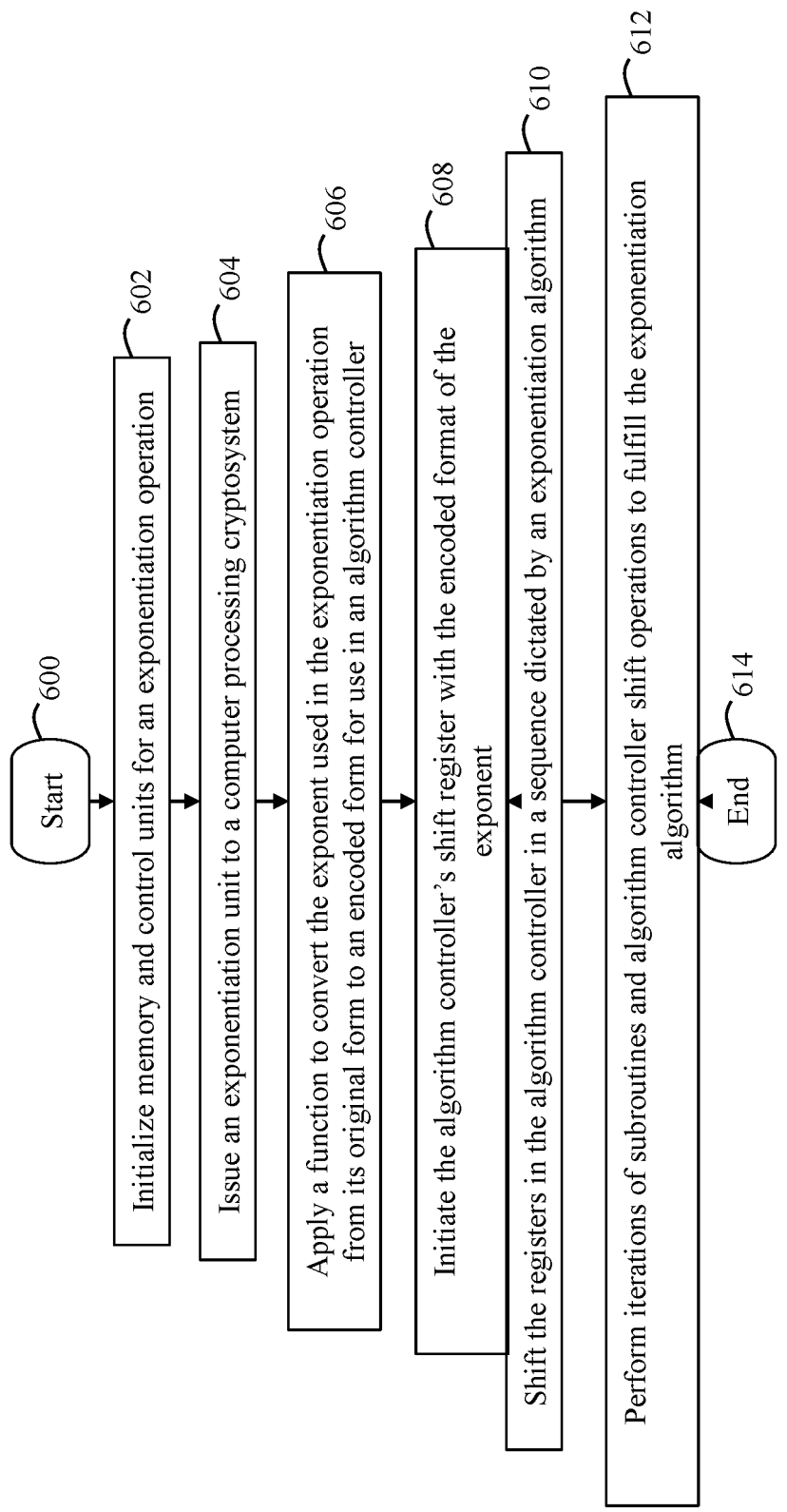
FIG. 6 is a process flow diagram depicting a computer-implemented method for implementing a plurality of at least one of modular exponentiation operation and/or at least one of scalar point multiplication operations in a computer processing cryptosystem in accordance with one embodiment of the present invention.

Input: P ∈ E, scalar k
Output: Q = [k]P
Begin
1. R1 = O, R2 = P
2. for bit i in k, from most significant to least significant
   3. if i = 0, then R1 = [2]R1, R2 = R1 + R2
   4.   else R1 = R1 + R2, R2 = [2]R2
5. end for
6. Output R1
End Algorithm 3
Three-point Montgomery ladder for SIKE Input: P, Q ∈ E, scalar k
Output: R = P + [k]Q
Begin
1. R0 = Q, R1 = P, R2 = Q − P
2. for bit i in k, from least significant to most significant significant
   3. if i = 0, then R1 = R0 + R1
   4.   else R2 = R0 + R2
   5. R0 = [2]R0
6. end for
7. Output R1
End With reference now to FIG. 6, a process flow diagram is depicted that for an exemplary computer-implemented method for implementing a plurality of exponentiation operations in a computer processing cryptosystem. Although FIG. 6 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 6 for the sake of brevity. In some embodiments, some or all of the process steps included in FIG. 6 can be combined into a single process. The process begins at step 600 and immediate proceeds to the step 602 of initializing memory and control units for an exponentiation operation. Thereafter, step 604 may include issuing an exponentiation unit to the computer processing cryptosystem.

Step 606 includes applying a function to convert the exponent used in the exponentiation from its original form to an encoded form for use in an algorithm controller. Additionally, step 608 includes initializing the algorithm controller's shift register with the encoded format of the exponent and step 610 beneficially includes shifting the registers in the algorithm controller in a sequence dictated by an exponentiation algorithm. Step 612 may include performing iterations of subroutines and algorithm controller shift operations to fulfill the exponentiation algorithm and the process may terminate in step 614.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A computer processing system for efficiently implementing exponentiation for multiple public key cryptosystems comprising:
   a processing unit operably configured to perform a plurality of exponentiation operations with different schemes utilizing at least one of a modular exponentiation operation and a scalar point multiplication operation and from at least one of the following group and over any parameter set: X25519, X448, Ed25519, and Ed448 and to perform at least one of the following group of key exchange mechanisms: DH, DSA, ECDH, ECDSA, ECJPAKE, EdDSA, SIKE, SIDH, CSIDH, SQISign; and
   a cryptosystem controller operably configured to load an exponent or a scalar from the at least one of modular exponentiation operation and the scalar point multiplication operation from a memory to an algorithm controller by first applying an encoding function configured to covert the exponent or scalar to a plurality of digits represented in the exponent or the scalar, the algorithm controller:
      including at least one set of shift registers operably configured to shift the plurality of digits received from the encoding function and operably configured to utilize at least one of the plurality of digits as an output utilized in multiple iterations of the at least one of the modular exponentiation operation and the scalar point multiplication operation; and
      operably configured to read the output and dictate a subroutine of operations forming part of the at least one of the modular exponentiation operation and the scalar point multiplication operation.

2. The computer processing system according to claim 1, wherein:
   the algorithm controller including at least one set of single direction shift registers operably configured to be initialized from the output of the encoding function.

3. The computer processing system according to claim 2, wherein:
   the encoding function is operably configured to be performed by a computing processing system external to the algorithm controller.

4. The computer processing system according to claim 2, wherein:
   the algorithm controller is operably configured to load and process a sequence of portions of the exponent when there are fewer shift registers than a total length of the exponent.

5. The computer processing system according to claim 1, wherein:
   the at least one set of shift registers are operably configured to perform circular shifts.

6. The computer processing system according to claim 1, wherein:
the processing unit is operably configured to perform left-to-right and right-to-left algorithms for the plurality of exponentiation operations.

7. The computer processing system according to claim 1, wherein:
the processing unit is operably configured to perform a plurality of at least one of modular exponentiation and/or at least one of scalar point multiplication operation.

8. The computer processing system according to claim 1, wherein:
the algorithm controller including a set of multiple direction shift registers operably configured to shift in a plurality of directions that are dictated by the algorithm controller.

9. The computer processing system according to claim 1, wherein:
the algorithm controller including a plurality of sets of single direction shift registers operably configured to share to the at least one of the plurality of digits as the output.

10. The computer processing system according to claim 1, wherein:
the algorithm controller including a plurality of sets of single direction shift registers operably configured to feed the at least one of the plurality of digits to a multiplexer that is operably configured to select the output.

11. A computer-implemented method for efficiently implementing a plurality of exponentiation operations in a computer processing cryptosystem comprising the steps of:
providing a processing unit operably configured to perform a plurality of exponentiation operations with different schemes utilizing at least one of a modular exponentiation operation and a scalar point multiplication operation;

initializing memory and control units for the at least one of the modular exponentiation operation and the scalar point multiplication operation and from at least one of the following group and over any parameter set: X25519, X448, Ed25519, and Ed448;

initializing memory and control units for the at least one of the modular exponentiation operation and the scalar point multiplication operation;

utilizing, in the computer processing cryptosystem, at least one of the following group of key exchange mechanisms: DH, DSA, ECDH, ECDSA, ECJPAKE, EdDSA, SIKE, SIDH, CSIDH, SQISign;

issuing an exponentiation unit to a computer processing cryptosystem;

applying an encoding function to generate an output by converting an exponent or a scalar used in the at least one of the modular exponentiation operation and the scalar point multiplication operation from its original form to a plurality digits represented in the exponent or the scalar;

initializing the algorithm controller's shift registers based on the output from the encoding function;

shifting the shift registers in the algorithm controller in a sequence dictated by the at least one of the modular exponentiation operation and the scalar point multiplication operation; and performing iterations of subroutines, wherein the algorithm controller shifts operations to fulfill the at least one of the modular exponentiation operation and the scalar point multiplication operation and, after an iteration, the registers shift such that each flip-flop to hold a bit of a previous flip-flop and the most significant flip-flop's value can be discarded or pushed to a least significant flip-flop.

* * * * *